United States Patent
Jia et al.

(10) Patent No.: US 9,325,538 B2
(45) Date of Patent: Apr. 26, 2016

(54) PRECODING IN HIGH-ORDER MIMO

(75) Inventors: Ming Jia, Ottawa (CA); Jianglei Ma, Kanata (CA); Peiying Zhu, Kanata (CA); Wen Tong, Ottawa (CA)

(73) Assignee: Apple Inc., Cupertino, CA (US)

( * ) Notice: Subject to any disclaimer, the term of this patent is extended or adjusted under 35 U.S.C. 154(b) by 914 days.

(21) Appl. No.: 12/339,568

(22) Filed: Dec. 19, 2008

(65) Prior Publication Data
US 2010/0002801 A1  Jan. 7, 2010

Related U.S. Application Data

(60) Provisional application No. 61/078,279, filed on Jul. 3, 2008.

(51) Int. Cl.
| | |
|---|---|
| H04B 7/02 | (2006.01) |
| H04L 25/03 | (2006.01) |
| H04B 7/04 | (2006.01) |
| H04B 7/06 | (2006.01) |

(52) U.S. Cl.
CPC ........ *H04L 25/03343* (2013.01); *H04B 7/0417* (2013.01); *H04B 7/0465* (2013.01); *H04B 7/063* (2013.01)

(58) Field of Classification Search
USPC ......................................................... 375/267
See application file for complete search history.

(56) References Cited

U.S. PATENT DOCUMENTS

| | | | | |
|---|---|---|---|---|
| 7,315,577 | B2* | 1/2008 | Shao | 375/260 |
| 2007/0147536 | A1* | 6/2007 | Melzer et al. | 375/267 |
| 2007/0174038 | A1* | 7/2007 | Wang et al. | 704/1 |
| 2008/0181285 | A1* | 7/2008 | Hwang et al. | 375/148 |
| 2009/0322621 | A1* | 12/2009 | Inanoglu et al. | 343/702 |

\* cited by examiner

*Primary Examiner* — Lihong Yu
(74) *Attorney, Agent, or Firm* — Meyertons, Hood, Kivlin, Kowert & Goetzel, P.C.

(57) ABSTRACT

A high-order Multiple-Input-Multiple-Output (MIMO) transmitter implementing a covariance-based precoding scheme that exploits transmit channel correlation and a method of operation thereof are provided. In one embodiment, covariance-based precoding is performed at the high-order MIMO transmitter based on feedback from a remote high-order MIMO receiver regarding a covariance-based precoding matrix. The covariance-based precoding matrix is, or is derived from, a transmit channel correlation matrix determined by the high-order MIMO receiver for the high-order MIMO transmitter. The covariance-based precoding provides a beam-forming effect when there is a relatively high degree of transmit channel correlation, thereby improving performance of the high-order MIMO transmitter. Further, because changes in the transmit channel correlation occur relatively slowly over time, feedback overhead requirements are substantially reduced as compared to that required for traditional MIMO precoding schemes.

22 Claims, 3 Drawing Sheets

PRECODING IN HIGH-ORDER MIMO

This application claims the benefit of U.S. provisional patent application Ser. No. 61/078,279, which was filed Jul. 3, 2008 and the disclosure of which is hereby incorporated herein by reference in its entirety.

FIELD OF THE INVENTION

The present invention relates to Multiple-Input-Multiple-Output (MIMO) wireless transceivers, and more particularly relates to a precoding scheme for high-order MIMO transmitters.

BACKGROUND OF THE INVENTION

For Multiple-Input-Multiple-Output (MIMO) wireless communication, multiple antennas are used at both the transmitter and the receiver. Because MIMO increases data throughput without additional bandwidth or transmit power, MIMO is becoming increasingly popular in wireless communications standards. One issue with MIMO is that transmission quality degrades in Line-of-Sight (LOS) and poor-scattering environments. More specifically, MIMO relies on an uncorrelated transmit channel resulting from a multi-path environment. However, in LOS and poor-scattering environments, transmit channel correlation increases. As a result, transmission quality decreases.

In order to address this issue, current MIMO transmitters typically operate in a closed-loop configuration. In the closed loop configuration, the MIMO transmitter performs transmit channel based precoding prior to transmission to a MIMO receiver. One such example is precoding for MIMO as defined by the Long Term Evolution (LTE) standard. In LTE, the MIMO receiver estimates the transmit channel and selects one of a number of predefined precoding matrices based on the estimate of the transmit channel. The precoding matrices are unitary, and the selected precoding matrix is one which will maximize capacity based on the estimate of the transmit channel. The MIMO receiver then provides feedback to the MIMO transmitter, where the feedback includes the selected precoding matrix or a reference to the selected precoding matrix in a codebook stored by the MIMO transmitter. The MIMO transmitter then applies the selected precoding matrix to a signal prior to transmission. However, since the transmit channel changes frequently and the precoding matrix is selected based on the transmit channel, the transmit precoding matrix must also be updated frequently. More specifically, the MIMO receiver must estimate the transmit channel, select a precoding matrix, and feed back the selected precoding matrix or a reference to the selected precoding matrix to the MIMO transmitter frequently in order to reflect changes in the transmit channel. Using MIMO as defined by the LTE standard as an example, a new precoding matrix is preferably selected and fed back on the order of every 4-5 sub-frames.

However, one issue with the transmit channel based precoding scheme of current closed loop MIMO transmitters is that the transmit channel based precoding scheme is not suitable for high-order MIMO. More specifically, as the order (i.e., number of antennas) increases, the complexity of the transmit channel precoding matrix and therefore the overhead required for feedback of the transmit channel based precoding matrix also increases. As such, there is a need for a precoding scheme for high-order MIMO that improves transmission quality and minimizes or substantially reduces the overhead required for feedback.

SUMMARY OF THE INVENTION

The present invention provides a covariance-based precoding scheme for a high-order Multiple-Input-Multiple-Output (MIMO) transmitter that exploits long-term transmit channel correlation. In one embodiment, covariance-based precoding is performed at the high-order MIMO transmitter based on feedback from a remote high-order MIMO receiver regarding a covariance-based precoding matrix. The covariance-based precoding matrix is, or is derived from, a transmit channel correlation matrix determined by the high-order MIMO receiver for the high-order MIMO transmitter. Further, the feedback regarding the covariance-based precoding matrix may be the covariance-based precoding matrix or a reference to the covariance-based precoding matrix. The covariance-based precoding provides a beam-forming effect when there is a relatively high degree of transmit channel correlation. Further, because changes in the transmit channel correlation occur relatively slowly over time, overhead required to feed back the information regarding the covariance-based precoding matrix from the high-order MIMO receiver to the high-order MIMO transmitter is substantially reduced as compared to that required for traditional MIMO precoding schemes.

In another embodiment, the high-order MIMO transmitter and the high-order MIMO receiver communicate using a modulation scheme, such as Orthogonal Frequency Division Multiplexing (OFDM), such that data is simultaneously transmitted from each transmit antenna on each of a number of sub-carrier frequencies. In this embodiment, the feedback from the high-order MIMO receiver is multiple precoding matrices or references to multiple precoding matrices, where each precoding matrix is, or is derived from, a transmit channel correlation matrix determined by the high-order MIMO receiver for one or more of the sub-carrier frequencies. Based on the feedback, the high-order MIMO transmitter performs covariance based precoding for data to be transmitted over each of the sub-carrier frequencies prior to transmission.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a covariance-based precoding scheme for high-order Multiple-Input-Multiple-Output (MIMO) wireless communication that exploits long-term transmit channel correlation. As used herein, high-order MIMO wireless communication uses eight or more transmit antennas and eight or more receive antennas. Note, however, that while the present invention is discussed herein with respect to high-order MIMO, the present invention may be used for lower order MIMO if desired. It should be noted that the benefit of traditional transmit channel based precoding using fast feedback is outweighed by the cost of the large amount of overhead required for feedback needed for high-order MIMO. Specifically, for a Long Term Evolution (LTE) system, experiments have shown that for 8×8 MIMO, the precoding gain resulting from traditional transmit channel based precoding using fast feedback is only 2.5 decibels (dB) as compared to open-loop operation. This amount of gain does not justify the overhead cost required for fast feedback. However, the covariance-based precoding scheme is preferably a slow feedback scheme that provides improved performance without the large overhead cost needed for fast feedback in traditional transmit channel based precoding schemes.

Figure 1:
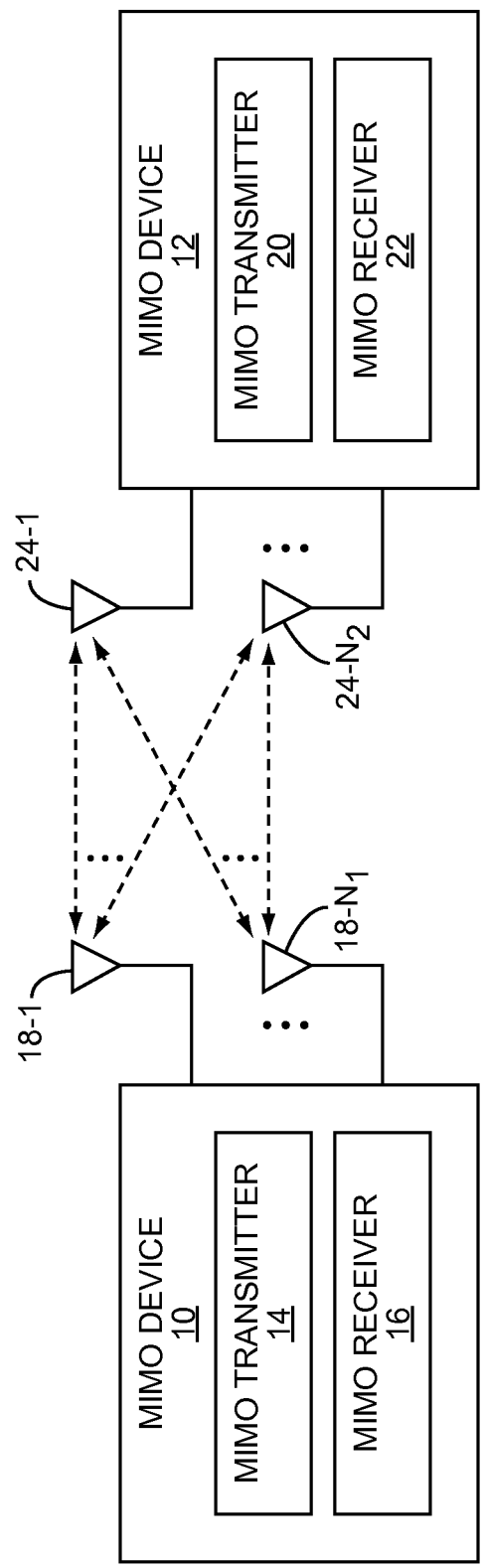
FIG. 1 illustrates a pair of high-order Multiple-Input-Multiple-Output (MIMO) devices implementing a covariance-based precoding scheme according to one embodiment of the present invention.

FIG. 1 illustrates a pair of high-order MIMO devices 10 and 12 (hereinafter MIMO devices 10 and 12) implementing a covariance-based precoding scheme according to one embodiment of the present invention. Each of the MIMO devices 10 and 12 may be any type of wireless MIMO communication device. For example, each of the MIMO devices 10 and 12 may be a base station in a cellular communications network, a mobile device having a cellular communication interface such as a mobile smart phone, a broadband access card providing broadband network access to a mobile device such as a notebook computer via a cellular communications network, an access point or wireless router for a wireless Local Area Network (LAN), a wireless network interface card for accessing a wireless LAN, or the like. As an example, the MIMO device 10 may be a base station in a cellular communications network, and the MIMO device 12 may be a mobile smart phone.

As illustrated, the MIMO device 10 includes a MIMO transmitter 14, a MIMO receiver 16, and a number of antennas 18-1 through 18-$N_1$. Note that in this embodiment, the antennas 18-1 through 18-$N_1$ are used by both the MIMO transmitter 14 and the MIMO receiver 16. As such, when discussing the MIMO transmitter 14, the antennas 18-1 through 18-$N_1$ are referred to herein as transmit antennas 18-1 through 18-$N_1$. Likewise, when discussing the MIMO receiver 16, the antennas 18-1 through 18-$N_1$ are referred to herein as receive antennas 18-1 through 18-$N_1$. The MIMO device 12 includes a MIMO transmitter 20, a MIMO receiver 22, and a number of antennas 24-1 through 24-$N_2$. Again, in this embodiment, the antennas 24-1 through 24-$N_2$ are used by both the MIMO transmitter 20 and the MIMO receiver 22. As such, when discussing the MIMO transmitter 20, the antennas 24-1 through 24-$N_2$ are referred to herein as transmit antennas 24-1 through 24-$N_2$. Likewise, when discussing the MIMO receiver 22, the antennas 24-1 through 24-$N_2$ are referred to herein as receive antennas 24-1 through 24-$N_2$.

The MIMO devices 10 and 12 are preferably high-order MIMO devices. However, the present invention is not limited thereto.

As discussed below in detail, the MIMO transmitter 14 of the MIMO device 10 provides covariance-based precoding based on feedback from the MIMO receiver 22 of the MIMO device 12. While not specifically discussed, in a similar manner, the MIMO transmitter 20 of the MIMO device 12 may provide covariance-based precoding based on feedback from the MIMO receiver 16 of the MIMO device 10. In one embodiment, a covariance-based precoding matrix, or a reference to a covariance-based precoding matrix in a codebook stored by the MIMO transmitter 14, is fed back to the MIMO transmitter 14 of the MIMO device 10 from the MIMO receiver 22 of the MIMO device 12. The covariance-based precoding matrix is then applied to data symbols prior to transmission in order to provide covariance-based precoding. Further, as discussed below in detail, the covariance-based precoding matrix is, or is derived from, a transmit channel correlation matrix for the transmit channel of the MIMO transmitter 14. Since transmit channel correlation changes relatively slowly over time, slow feedback, or long-term feedback, may be used. As used herein, slow feedback, or long-term feedback, is feedback that occurs substantially more slowly than the fast feedback needed for traditional transmit channel based precoding or over a substantially longer period of time than the fast feedback needed for traditional transmit channel based precoding. For example, the feedback needed for the covariance-based precoding may be one-hundred or more times slower than that required for typical closed-loop MIMO precoding.

When there is low transmit channel correlation (i.e., the transmit channel correlation matrix is or approaches a random matrix), the covariance-based precoding matrix used to provide covariance-based precoding approaches an identity matrix. As a result, typical MIMO spatial multiplexing gain is exploited. There is typically low transmit channel correlation when, for example, the MIMO transmitter 14 is operating in a rich-scattering environment. However, when there is high channel correlation, the covariance-based precoding matrix exploits the high channel correlation to provide a beam-forming effect, thereby improving the quality of transmission. The high channel correlation may result from the large number of antennas of the high-order MIMO transmitter 14, a Line-of-Sight (LOS) or poor scattering environment, or a combination thereof. Using the covariance-based precoding matrix, the MIMO transmitter 14 naturally and gradually transitions from spatial multiplexing operation to beam-forming operation as the transmit channel correlation increases from a minimum to a maximum, and vice-versa.

Figure 2:
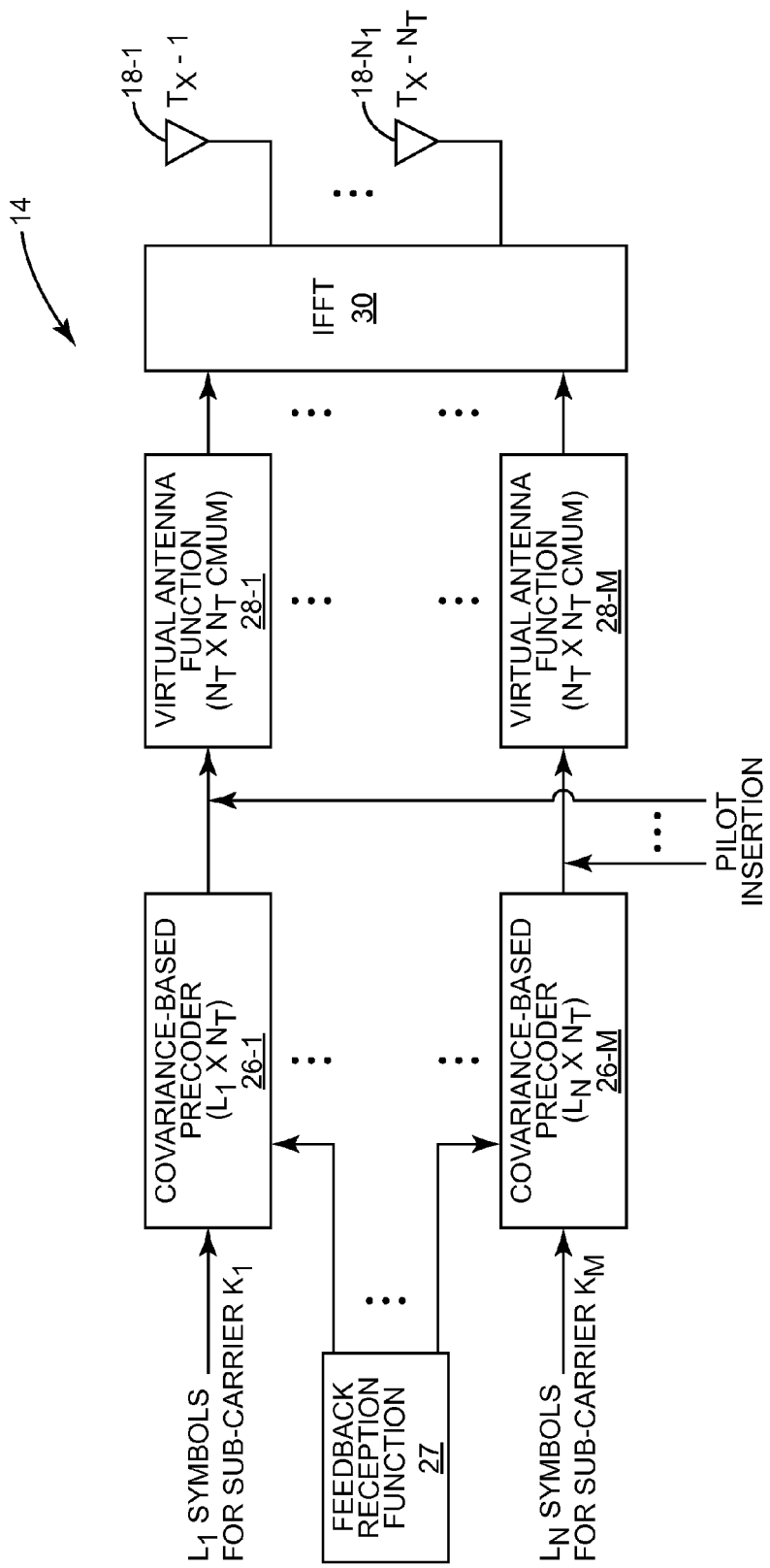
FIG. 2 is a block diagram of a high-order MIMO transmitter providing covariance-based precoding according to one embodiment of the present invention.

FIG. 2 illustrates the MIMO transmitter 14 of the MIMO device 10 of FIG. 1 in more detail according to one embodiment of the present invention. This discussion is equally applicable to the MIMO transmitter 20 of the MIMO device 12. In this embodiment, a modulation scheme is utilized in which data is simultaneously transmitted from each of the transmit antennas 18-1 through 18-$N_1$ over a number of sub-carrier frequencies. For example, the modulation scheme may be Orthogonal Frequency Division Multiplexing (OFDM), Orthogonal Frequency Division Multiple Access (OFDMA), Single-Carrier Frequency Division Multiple Access (SC-OFDMA), or the like. Note, however, that the present invention is not limited thereto. The covariance-based precoding scheme discussed herein is equally applicable to a modulation scheme that uses a single carrier frequency rather than multiple sub-carrier frequencies.

As illustrated, the MIMO transmitter 14 includes a number of covariance-based precoders 26-1 through 26-M, where M is the number of sub-carrier frequencies or sub-bands in the bandwidth of the transmit channel. The covariance-based precoders 26-1 through 26-M provide covariance-based precoding for data to be transmitted on the sub-carrier frequencies based on corresponding precoding matrices. In this embodiment, the precoding matrices are provided to the covariance-based precoders 26-1 through 26-M from a feedback reception function 27, which operates to receive the feedback from the MIMO receiver 22 of the MIMO device 12 (FIG. 1) and, if needed, obtain the covariance-based precoding matrices based on the feedback. The feedback reception function 27 may, for example, be part of the MIMO receiver 16 of the MIMO device 10. In one embodiment, the MIMO receiver 22 feeds back either the precoding matrices or references to the precoding matrices in a codebook or other data structure stored by the MIMO transmitter 14. However, other feedback types, such as analog sounding, may alternatively be used. Further, in one embodiment, each of the covariance-based precoders 26-1 through 26-M uses a separate covariance-based precoding matrix. However, in another embodiment, the same precoding matrix may be used by more than one of the covariance-based precoders 26-1 through 26-M. More specifically, the transmit channel correlation changes relatively slowly over frequency. As such, the same covariance-based precoding matrix may be used for more than one contiguous sub-band.

The covariance-based precoder 26-1 operates to apply a $L_1 \times N_T$ covariance-based precoding matrix to a $1 \times L_1$ vector of data symbols for a first sub-carrier frequency ($K_1$). For LTE, the data symbols are Quadrature Amplitude Modulation (QAM) symbols. $L_1$ is the number of eigen-layers, or simultaneous data streams, that may be transmitted over the first sub-carrier frequency ($K_1$). As will be apparent to one of ordinary skill in the art, the number of eigen-layers is determined by the MIMO receiver 22 based on singular value decomposition (SVD) of a transmit channel matrix estimating the transmit channel for the sub-carrier frequency. The $1 \times L_1$ vector includes one data symbol for each of the $L_1$ eigen-layers. $N_T$ is the number of transmit antennas 18-1 through 18-$N_1$. In operation, a $1 \times L_1$ vector of data symbols is input to the covariance-based precoder 26-1. The covariance-based precoder 26-1 then applies the $L_1 \times N_T$ precoding matrix for the sub-carrier frequency to the $1 \times L_1$ vector of data symbols using matrix multiplication to provide a $1 \times N_T$ vector of precoded values. The process continues such that the covariance-based precoder 26-1 then precodes a next $1 \times L_1$ vector of data symbols.

In a similar manner, the remaining covariance-based precoders 26-2 through 26-M apply corresponding covariance-based matrices to data symbols for the remaining sub-carrier frequencies ($K_2$ through $K_M$). Note that each sub-carrier frequency may have a different number of eigen-layers. As such, the vectors of data symbols input to each of the covariance-based precoders 26-1 through 26-M may have a different number of symbols. As a result, the covariance-based precoding matrices applied by the covariance-based precoders 26-1 through 26-M may also have a different number of rows.

After precoding, pilot symbols are inserted, and the output of the covariance-based precoders 26-1 through 26-M including the inserted pilot symbols are input to virtual antenna functions 28-1 through 28-M, respectively. More specifically, for each of the sub-carrier frequencies, the number of eigen-layers for that sub-carrier frequency is typically less than the number of transmit antennas ($N_T$). For example, for in 8×8 MIMO, there are typically about five eigen-layers per sub-carrier frequency. In order to utilize all eight antennas even though there are less than eight layers for each sub-carrier frequency, the virtual antenna functions 28-1 through 28-M apply a $N_T \times N_T$ constant modulus unitary matrix to the outputs of the covariance-based precoders 26-1 through 26-M to provide a virtual antenna effect.

The outputs of the virtual antenna functions 28-1 through 28-M are applied to an Inverse Fast Fourier Transform (IFFT) function 30, which performs per antenna based IFFTs. More specifically, the output of each of the virtual antenna functions 28-1 through 28-M is a $1 \times N_T$ vector. In operation, the IFFT function 30 simultaneously performs an IFFT for each of the transmit antennas 18-1 through 18-$N_1$. More specifically, the IFFT function 30 performs a first IFFT on first values from the $1 \times N_T$ vectors output by the virtual antenna functions 28-1 through 28-M, and the results of the IFFT are provided to the first transmit antenna 18-1. The IFFT function 30 simultaneously performs a second IFFT on second values from the $1 \times N_T$ vectors output by the virtual antenna functions 28-1 through 28-M, and the results of the IFFT are provided to the second transmit antenna 18-2. In the same manner, the IFFT function 30 simultaneously performs IFFTs for each of the remaining transmit antennas 18-3 through 18-$N_1$.

Figure 3:
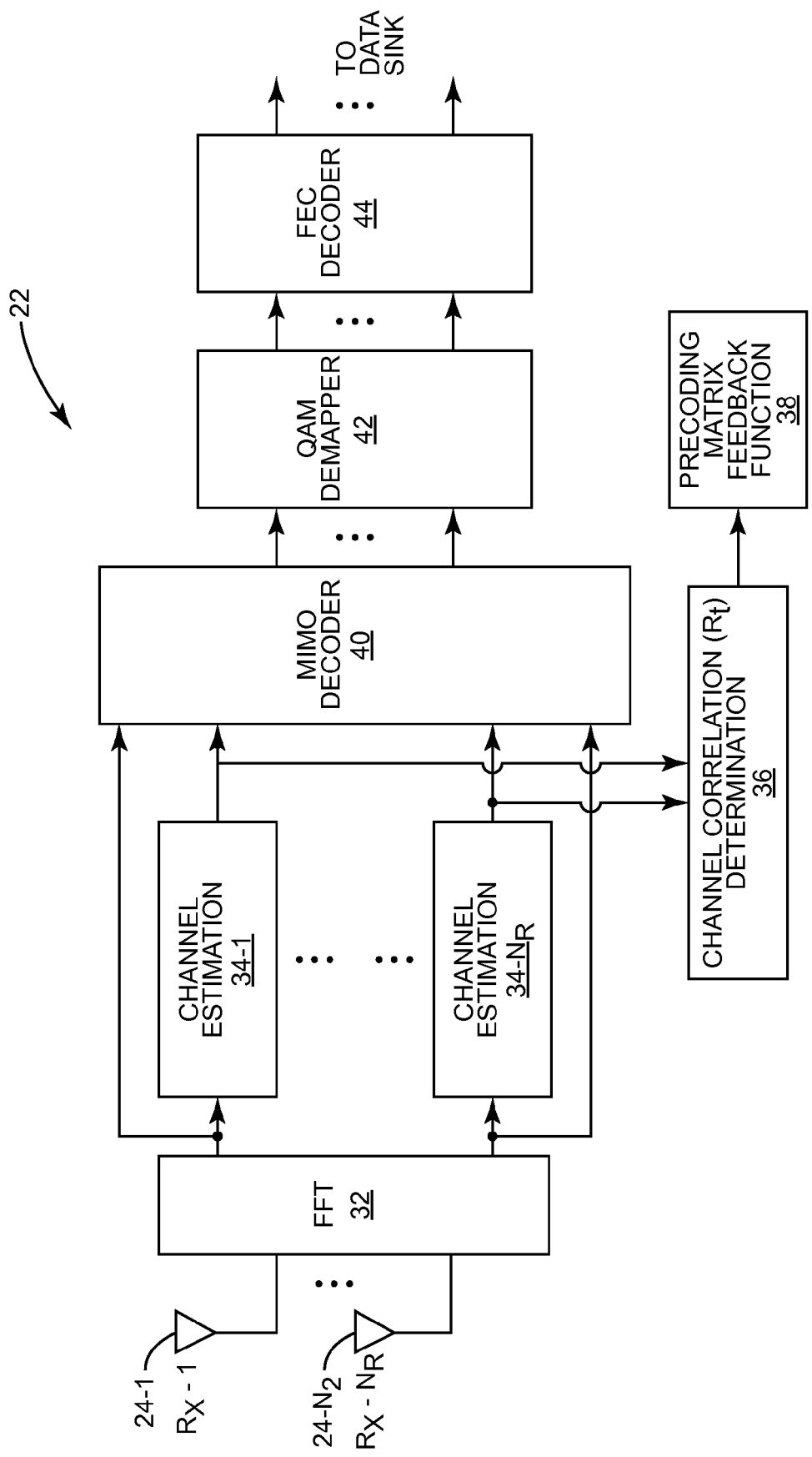
FIG. 3 is a block diagram of a high-order MIMO receiver providing feedback to a high-order MIMO transmitter for covariance-based precoding according to one embodiment of the present invention.

FIG. 3 illustrates the MIMO receiver 22 of the MIMO device 12 of FIG. 1 in more detail according to one embodiment of the present invention. This discussion is equally applicable to the MIMO receiver 16 of the MIMO device 10. The MIMO receiver 22 includes a Fast Fourier Transform (FFT) function 32 that receives an input from each of the receive antennas 24-1 through 24-$N_2$ and performs per antenna FFTs. More specifically, the FFT function 32 simultaneously performs an FFT for each of the receive antennas 24-1 through 24-$N_2$. The results of the per antenna FFTs are provided to corresponding channel estimation functions 34-1 through 34-$N_R$, where $N_R$ is the number of receive antennas, which in this example is $N_2$. The channel estimation functions 34-1 through 34-$N_R$ estimate the transmit channel for each sub-carrier frequency. The estimates of the transmit channel for each sub-carrier frequency are provided to a channel correlation determination function 36. As discussed below, in this embodiment, the channel correlation determination function 36 determines a channel correlation matrix ($R_t$) for each sub-carrier frequency based on the estimates from the channel estimation functions 34-1 through 34-$N_R$.

In one embodiment, the channel correlation matrices ($R_t$) for the sub-carrier frequencies are the corresponding covariance-based preceding matrices. In another embodiment, when rank is reported back to the MIMO transmitter 14, for each sub-carrier frequency, columns of a singular value decomposition element ($V_t$) of the transmit channel correlation matrix ($R_t$) corresponding to strong eigen-layers may be used as the precoding matrix for the sub-carrier frequency. A precoding matrix feedback function 38 then feeds back the covariance-based precoding matrices for the sub-carrier frequencies to the MIMO transmitter 14 of the MIMO device 10 via the MIMO transmitter 20 of the MIMO device 12. The covariance-based preceding matrices may be fed back by feeding back the covariance-based preceding matrices themselves, by feeding back references or indexes to the covariance-based preceding matrices in a codebook or similar data structure stored by the MIMO transmitter 14, or the like. As another example, an analog sounding channel may be used to feed back the precoding matrices to the MIMO transmitter 14.

Returning to the FFT function 32, the results of the per antenna FFTs are also provided to a MIMO decoder 40. The MIMO decoder 40 processes the outputs of the FFT function 32 to provide a symbol estimate for each layer transmitted by the MIMO transmitter 14. A QAM demapper 42 and a Forward Error Correction (FEC) decoder 44 then process the symbol estimates from the MIMO decoder 40 to simultaneously recover the transmitted data for each layer transmitted by the MIMO transmitter 14. The data for each layer is then provided to a data sink. The data sink may be, for example, a Media Access Control (MAC) layer of the MIMO device 12.

The following is a mathematical description of one embodiment of the present invention. This discussion focuses on generating a covariance-based precoding matrix for a sub-carrier frequency. The same may be done for each sub-carrier frequency or, alternatively, a single carrier frequency in a single carrier frequency embodiment. A correlated MIMO transmit channel (H) can be modeled as $$H = H_w (R_t^{1/2})', \quad (1)$$

where $H_w$ is the spatially white (Rayleigh i.i.d.) MIMO transmit channel, and $R_t$ is the transmit channel correlation matrix for the sub-carrier frequency. The transmit channel correlation matrix ($R_t$) is defined as:

$$R_t = E\left[(\vec{h}_i^{row})' \vec{h}_i^{row}\right], \quad (2)$$

where E is the expected value and $\vec{h}_t^{row}$ can be any row of the transmit channel correlation matrix. Further, it can be verified that:

$$E[H'H] = E[R_t^{1/2} H'_w H_w (R_t^{1/2})'] = R_t. \quad (3)$$

As such, the channel correlation determination function 36 may estimate the transmit channel correlation matrix ($R_t$) for the sub-carrier frequency based on the following equation:

$$\tilde{R}_t = \sum_k H'_k H_k, \quad (4)$$

where $\tilde{R}_t$ is the estimate of the transmit channel correlation matrix ($R_t$) for the sub-carrier frequency and $H_k$ is the estimate of the transmit channel for the sub-carrier frequency for the kth pilot. Thus, Equation (4) states that the transmit channel correlation matrix ($R_t$) can be estimated as the summation of the transmit channel estimates for the sub-carrier frequency from the channel estimation functions 34-1 through 34-$N_R$ for the kth pilot. The estimated transmit channel correlation matrix, or a reference thereto, may then be fed back to the MIMO transmitter 14 as the covariance-based precoding matrix for the sub-carrier frequency such that the equivalent MIMO transmit channel for that sub-carrier frequency becomes:

$$R_t^{1/2} H = H_w. \quad (5)$$

Alternatively, $R_t^{1/2}$, or a reference thereto, may be fed back to the MIMO transmitter 14.

In another embodiment, when rank is reported to the MIMO transmitter 14, it may be desirable to use columns of a singular value decomposed element ($V_t$) of the transmit channel correlation matrix ($R_t$) corresponding to strong eigen-layers (i.e., large values in $D_t^{1/2}$ of the transmit correlation matrix ($R_t$)) as the precoding matrix for the corresponding sub-carrier frequency. More specifically, the square root of the transmit channel correlation matrix ($R_t^{1/2}$) is defined by the following equation:

$$R_t^{1/2} = D_t^{1/2} V'_t, \quad (6)$$

where $V_t$ and $D_t$ are the singular value decomposed elements of the transmit channel correlation matrix ($R_t$). Substituting Equation (6) into Equation (1) provides $$H = H_w D_t^{1/2} V'_t. \quad (7)$$

By applying $V_t$ to Equation (7), we get the equivalent MIMO channel for the sub-carrier frequency as $$V_t H = H_w D_t^{1/2}. \quad (8)$$

When there is low transmit channel correlation, $V_t$ approaches an identity matrix. In contrast, when there is high transmit channel correlation, $V_t$ approaches beam-forming.

Those skilled in the art will recognize improvements and modifications to the preferred embodiments of the present invention. All such improvements and modifications are considered within the scope of the concepts disclosed herein and the claims that follow.

What is claimed is:

1. A method of operating a high-order Multiple-Input-Multiple-Output (MIMO) transmitter, comprising:
receiving feedback that is long-term feedback from a remote high-order MIMO receiver regarding a covariance-based precoding matrix, the covariance-based precoding matrix being related to a transmit channel correlation matrix for the high-order MIMO transmitter that defines an existing transmit channel correlation, wherein the covariance-based precoding matrix is one or more columns of a singular value decomposed element $V_t$ of the transmit channel correlation matrix for a transmit channel of the high-order MIMO transmitter, wherein the one or more columns of the singular value decomposed element $V_t$ are one or more columns of the singular value decomposed element $V_t$ corresponding to values in a square root of a singular decomposed element $D_t$ of the transmit channel correlation matrix for the transmit channel that are greater than a predetermined threshold; and
precoding a plurality of data symbols based on the covariance-based precoding matrix prior to transmission by the high-order MIMO transmitter.

2. The method of claim 1 wherein the covariance-based precoding matrix is a transmit channel correlation matrix for a transmit channel of the high-order MIMO transmitter.

3. The method of claim 1 wherein precoding the plurality of data symbols comprises applying the covariance-based precoding matrix to a vector comprising the plurality of data symbols.

4. The method of claim 3 wherein the number of data symbols in the vector corresponds to a number of layers to be transmitted by the high-order MIMO transmitter.

5. The method of claim 1 wherein precoding the plurality of data symbols based on the covariance-based precoding matrix has a beam-forming effect when a transmit channel of the high-order MIMO transmitter is correlated.

6. The method of claim 1 wherein:
receiving feedback comprises receiving feedback from the remote high-order MIMO receiver regarding a plurality of covariance-based precoding matrices, each of the plurality of covariance-based precoding matrices being for at least one sub-carrier frequency of a transmit channel of the high-order MIMO transmitter; and
precoding the plurality of data symbols comprises, for each sub-carrier frequency of the transmit channel of the high-order MIMO transmitter, precoding a plurality of data symbols to be transmitted over the sub-carrier frequency based on a covariance-based precoding matrix from the plurality of covariance-based precoding matrices that is for the sub-carrier frequency.

7. The method of claim 6 wherein precoding the plurality of data symbols to be transmitted over the sub-carrier frequency comprises performing a matrix multiplication of the covariance-based precoding matrix for the sub-carrier frequency and a vector including the plurality of data symbols to be transmitted over the sub-carrier frequency.

8. The method of claim 7 wherein the plurality of data symbols to be transmitted over the sub-carrier frequency includes one data symbol for each layer to be transmitted over the sub-carrier frequency.

9. The method of claim 6 further comprising:
for each sub-carrier frequency of the transmit channel, applying a constant modulus unitary matrix to precoded values resulting from precoding the plurality of data symbols to be transmitted over the sub-carry frequency based on the covariance-based precoding matrix for the sub-carrier frequency to provide a plurality of output values for the sub-carrier frequency including one value for each transmit antenna of a plurality of transmit antennas of the high-order MIMO transmitter;
processing the plurality of output values for each of the sub-carrier frequencies of the transmit channel to perform a per antenna inverse Fourier transform function; and
providing results of the per antenna inverse Fourier transform function to the plurality of transmit antennas of the high-order MIMO transmitter for transmission.

10. The method of claim 1 wherein receiving the feedback from the remote high-order MIMO receiver comprises receiving the covariance-based precoding matrix from a feedback function of the remote high-order MIMO receiver.

11. The method of claim 1 wherein receiving the feedback from the remote high-order MIMO receiver comprises receiving a reference to the covariance-based precoding matrix from a feedback function of the remote high-order MIMO receiver.

12. The method of claim 1 wherein receiving the feedback from the remote high-order MIMO receiver comprises receiving the feedback from the remote high-order MIMO receiver via an analog sounding channel.

13. The method of claim 1 wherein the high-order MIMO transmitter has at least eight transmit antennas and the remote high-order MIMO receiver has at least eight receive antennas.

14. A high-order Multiple-Input-Multiple-Output (MIMO) transmitter comprising:
a feedback reception function adapted to receive feedback that is long-term feedback from a remote high-order MIMO receiver regarding a covariance-based precoding matrix, the covariance-based precoding matrix being related to a transmit channel correlation matrix for the high-order MIMO transmitter that defines an existing transmit channel correlation, wherein the covariance-based precoding matrix is one or more columns of a singular value decomposed element $V_t$ of the transmit channel correlation matrix for a transmit channel of the high-order MIMO transmitter, wherein the one or more columns of the singular value decomposed element $V_t$ are one or more columns of the singular value decomposed element $V_t$ corresponding to values in a square root of a singular decomposed element $D_t$ of the transmit channel correlation matrix for the transmit channel that are greater than a predetermined threshold; and
covariance-based precoding circuitry adapted to precode a plurality of data symbols prior to transmission by the high-order MIMO transmitter based on the covariance-based precoding matrix.

15. The high-order MIMO transmitter of claim 14 wherein the covariance-based precoding matrix is a transmit channel correlation matrix for a transmit channel of the high-order MIMO transmitter.

16. The high-order MIMO transmitter of claim 14 wherein:
the feedback reception function is adapted to receive feedback from the remote high-order MIMO receiver regarding a plurality of covariance-based precoding matrices, each of the plurality of covariance-based preceding matrices being for at least one sub-carrier frequency of a transmit channel of the high-order MIMO transmitter; and
for each sub-carrier frequency of the transmit channel of the high-order MIMO transmitter, the covariance-based preceding circuitry comprises a precoder adapted to precode a plurality of data symbols to be transmitted over the sub-carrier frequency based on a covariance-based precoding matrix from the plurality of covariance-based precoding matrices that is for the sub-carrier frequency.

17. The high-order MIMO transmitter of claim 16 wherein for each sub-carrier frequency, the precoder for the sub-carrier frequency is adapted to perform a matrix multiplication of the covariance-based precoding matrix for the sub-carrier frequency and a vector including the plurality of data symbols to be transmitted over the sub-carrier frequency.

18. The high-order MIMO transmitter of claim 17 wherein the plurality of data symbols to be transmitted over the sub-carrier frequency includes one data symbol for each layer to be transmitted over the sub-carrier frequency.

19. The high-order MIMO transmitter of claim 16 further comprising:
for each sub-carrier frequency of the transmit channel, a virtual antenna function adapted to apply a constant modulus unitary matrix to precoded values output from the precoder for the sub-carrier frequency to provide a plurality of output values for the sub-carrier frequency including one value for each transmit antenna of a plurality of transmit antennas of the high-order MIMO transmitter; and
an inverse Fourier transform function adapted to process the plurality of output values for each of the sub-carrier frequencies of the transmit channel to perform per antenna inverse Fourier transforms, wherein results of the per antenna inverse Fourier transforms are provided to the plurality of transmit antennas of the high-order MIMO transmitter for transmission.

20. The high-order MIMO transmitter of claim 14 wherein the high-order MIMO transmitter has at least eight transmit antennas and the remote high-order MIMO receiver has at least eight receive antennas.

21. A method of operating a high-order Multiple-Input-Multiple-Output (MIMO) transmitter, comprising:
receiving feedback from a remote high-order MIMO receiver regarding a covariance-based precoding matrix, the covariance-based precoding matrix being related to a transmit channel correlation matrix for the high-order MIMO transmitter that defines an existing transmit channel correlation; and
precoding a plurality of data symbols based on the covariance-based precoding matrix prior to transmission by the high-order MIMO transmitter; wherein the number of data symbols in the plurality of data symbols corresponds to a number of layers to be transmitted by the high-order MIMO transmitter;

for at least one subcarrier frequency, applying a constant modulus unitary matrix to precoded values resulting from precoding the plurality of data symbols to be transmitted over based on the covariance-based precoding matrix to provide a plurality of output values including one value for each transmit antenna of a plurality of transmit antennas of the high-order MIMO transmitter;

processing the plurality of output values for each of the sub-carrier frequencies of the transmit channel to perform a per antenna inverse Fourier transform function, wherein the inverse Fourier transform function performs an inverse Fourier transform on each of the layers to be transmitted; and providing results of the per antenna inverse Fourier transform function to the plurality of transmit antennas of the high-order MIMO transmitter for transmission.

22. A high-order Multiple-Input-Multiple-Output (MIMO) transmitter comprising:

a feedback reception function adapted to receive feedback from a remote high-order MIMO receiver regarding a covariance-based precoding matrix, the covariance-based precoding matrix being related to a transmit channel correlation matrix for the high-order MIMO transmitter that defines an existing transmit channel correlation; and covariance-based precoding circuitry adapted to precode a plurality of data symbols prior to transmission by the high-order MIMO transmitter based on the covariance-based precoding matrix;

for at least one subcarrier frequency, a virtual antenna function adapted to apply a constant modulus unitary matrix to precoded values output from the precoder to provide a plurality of output values including one value for each transmit antenna of a plurality of transmit antennas of the high-order MIMO transmitter; and an inverse Fourier transform function adapted to process the plurality of output values to perform per antenna inverse Fourier transforms, wherein the inverse Fourier transform function performs an inverse Fourier transform on each of the virtual antenna outputs to be transmitted; wherein results of the per antenna inverse Fourier transforms are provided to the plurality of transmit antennas of the high-order MIMO transmitter for transmission.

* * * * *